United States Patent [19]
Owens et al.

[11] Patent Number: 5,124,957
[45] Date of Patent: Jun. 23, 1992

[54] FILTER ALERT APPARATUS

[76] Inventors: Ronald E. Owens; Janet L. Owens, both of 848 San Marcos La., Bedford, Tex. 76021

[21] Appl. No.: 343,811

[22] Filed: Apr. 25, 1989

[51] Int. Cl.⁵ .............................................. G04F 8/00
[52] U.S. Cl. ...................... 368/107; 368/276; 368/316; 368/317
[58] Field of Search .................. 368/167–169, 368/276, 316, 317; 248/223.4, 310, 115

[56] References Cited

U.S. PATENT DOCUMENTS

| | | | |
|---|---|---|---|
| 472,162 | 4/1892 | Davies | 368/317 |
| 1,853,483 | 4/1932 | Winters | 368/316 |
| 2,292,959 | 8/1942 | Monson | 248/223.4 |
| 2,538,449 | 1/1951 | Freshwater | 248/115 |
| 2,711,263 | 11/1956 | Boho | 248/223.4 |
| 3,914,951 | 10/1975 | Heidorn | 368/108 |
| 3,927,315 | 12/1975 | Werry | 248/223.4 |
| 4,218,871 | 8/1980 | Moritani et al. | 368/109 |
| 4,444,512 | 4/1984 | Piguet et al. | 368/250 |

FOREIGN PATENT DOCUMENTS

| | | | |
|---|---|---|---|
| 127076 | 8/1928 | Switzerland | 368/316 |
| 1008991 | 11/1965 | United Kingdom | 248/223.4 |
| 1362547 | 8/1974 | United Kingdom | 248/223.4 |
| 2047519 | 12/1980 | United Kingdom | 248/223.4 |
| 2149013 | 6/1985 | United Kingdom | 248/223.4 |

*Primary Examiner*—Bernard Roskoski
*Attorney, Agent, or Firm*—Leon Gilden

[57] ABSTRACT

A programmable timing device for use in combination with an existing thermostat housing is set forth wherein the apparatus effects actuation selectively or in combination of an audible and visual display to alert an individual to a need in maintenance of an associated furnace air filter. The apparatus may be secured to a wall surface or optionally, adhesively secured to the existing thermostat housing by means of a mounting bracket. The mounting bracket is provided with break-away orthogonally oriented grooves to accommodate the housing of the timing apparatus in regions of limited support wall surface area to accommodate the entire mounting bracket.

1 Claim, 4 Drawing Sheets

FILTER ALERT APPARATUS

BACKGROUND OF THE INVENTION

1. Field of the Invention

The field of invention relates to timing devices, and more particularly pertains to a new and improved filter alert apparatus wherein the same may be accommodated within limited surrounding surface area of an existing thermostat housing to alert a user of a maintenance need in association with a furnace air filter arrangement.

2. Description of the Prior Art

The use of timing devices for various needs is well known in the prior art. The timing devices of the prior art have been arranged for both general and specific event alert situations, but have heretofore failed to set forth a specific inter-relationship between an existing thermostat arrangement in a dwelling or the like to alert an individual of a need to effect maintenance of an air filter arrangement associated with an existing furnace. For example, U.S. Pat. No. 4,087,679 to Maymarev sets forth a timing device that is selectively programmable to indicate when selective appointments ar to be met, including a support surface for receiving characters to indicate depicted hours and predetermined intervals in minutes of a given period with the timing means deriving sequential timing signals at predetermined intervals to provide an output signal when there is a correspondence between a timing signal and a respective one of the markings.

U.S. Pat. No. 4,218,871 to Moritani, et al., sets forth an electronic timer with a pre-settable counter for alerting an individual to pre-selected events of a generic nature.

U.S. Pat. No. 4,444,512 to Piguet, et al., sets forth an arrangement to permit a user to program a desired periodic warning signal to remind one of a daily, weekly, monthly or yearly event.

U.S. Pat. No. 4,659,233 to Nakamura, et al., sets forth a time piece of conventional construction with a built-in timer wherein the time piece and timer may be operative in conjunction with one another or separably.

U.S. Pat. No. 4,660,991 to Simon sets forth a signalling timing mechanism to alert an individual of predetermined intervals for taking of drugs and the like.

As such, it may be appreciated that the timing devices of the prior art are of both a generic and specific nature to accommodate individuals and alert such individuals of specific timing events and remedial action required in association with the event. As such, the instant invention addresses both the problems of compactness of organization and adaptability for use in conjunction with existing thermostat structure to visually and audibly in a selective manner alert individuals as to the need for remedial actions in association with furnace filters.

SUMMARY OF THE INVENTION

In view of the foregoing disadvantages inherent in the known types of timing apparatus now present in the prior art, the present invention provides a filter alert apparatus wherein the same may be compactly and efficiently secured in association with an existing thermostat housing to provide effective alert signals in association with the thermostat and furnace organization. As such, the general purpose of the present invention which will be described subsequently in greater detail, is to provide a new and improved filter alert apparatus which has all the advantages of the prior art timing devices and none of the disadvantages.

To attain this, the present invention comprises a filter alert apparatus utilizing a housing containing logic circuitry to effect a selective visual and audible signal in conjunction with a pre-selected month, day, and time preset by an individual. The housing is securable along a mounting bracket wherein the mounting bracket is provided with frangible sections to selectively shorten the length of the mounting bracket to accommodate limited support wall surfaces adjacent an existent thermostat housing. The mounting bracket may selectively be adhesively secured to the thermostat housing wherein the housing is provided with plural pairs of aligned detents springs to cooperate with associate detents within the mounting bracket.

My invention resides not in any one of these features per se but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows ma be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved filter alert apparatus which has all the advantages of the prior art timing devices and none of the disadvantages.

It is another object of the present invention to provide a new and improved filter alert apparatus which may be easily and efficiently manufactured and marketed.

It is a further object of the present invention to provide a new and improved filter alert apparatus which is of a durable and reliable construction.

An even further object of the present invention is to provide a new and improved filter alert apparatus which is susceptible of a low cost of manufacture with regard to both materials and labor, and which accordingly is then susceptible of low prices of sale to the consuming public, thereby making such filter alert apparatus economically available to the buying public.

Still yet another object of the present invention is to provide a new and improved filter alert apparatus which provides in the apparatuses and methods of the prior art some of the advantages thereof, while simultaneously overcoming some of the disadvantages normally associated therewith.

Still another object of the present invention is to provide a new and improved filter alert apparatus that is programmable to provide an audible and visual signal on an alert basis in response to a pre-selected timing event corresponding to a need for furnace air filter maintenance.

Yet another object of the present invention is to provide a new and improved filter alert apparatus wherein a housing is provided with plural pairs of biasing means to associate within corresponding detents of a mounting bracket of selective length to accommodate limited support surface adjacent existing thermostat housings.

These together with other objects of the invention, along with the various features of novelty which characterize the invention, are pointed out with particularity in the claims annexed to and forming a part of this disclosure For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1a is an orthographic view taken along he lines 1a-1a of FIG. 1 in the direction indicated by the arrows.

FIG. 3a is a partial isometric illustration of the mounting bracket of FIG. 3.

DESCRIPTION OF THE PREFERRED EMBODIMENT

Figure 1:
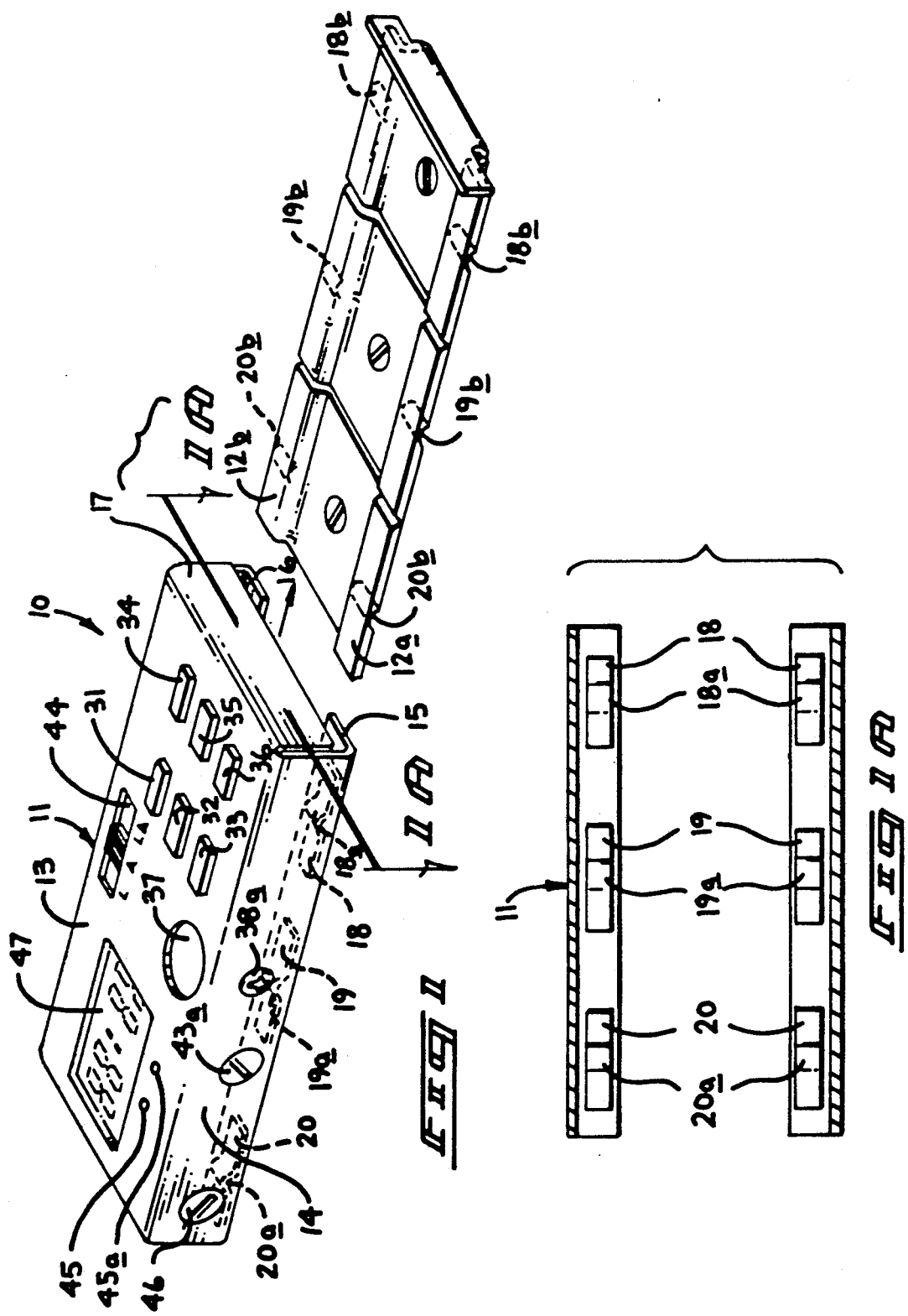
FIG. 1 is an isometric illustrations of the instant invention.
Figure 2:
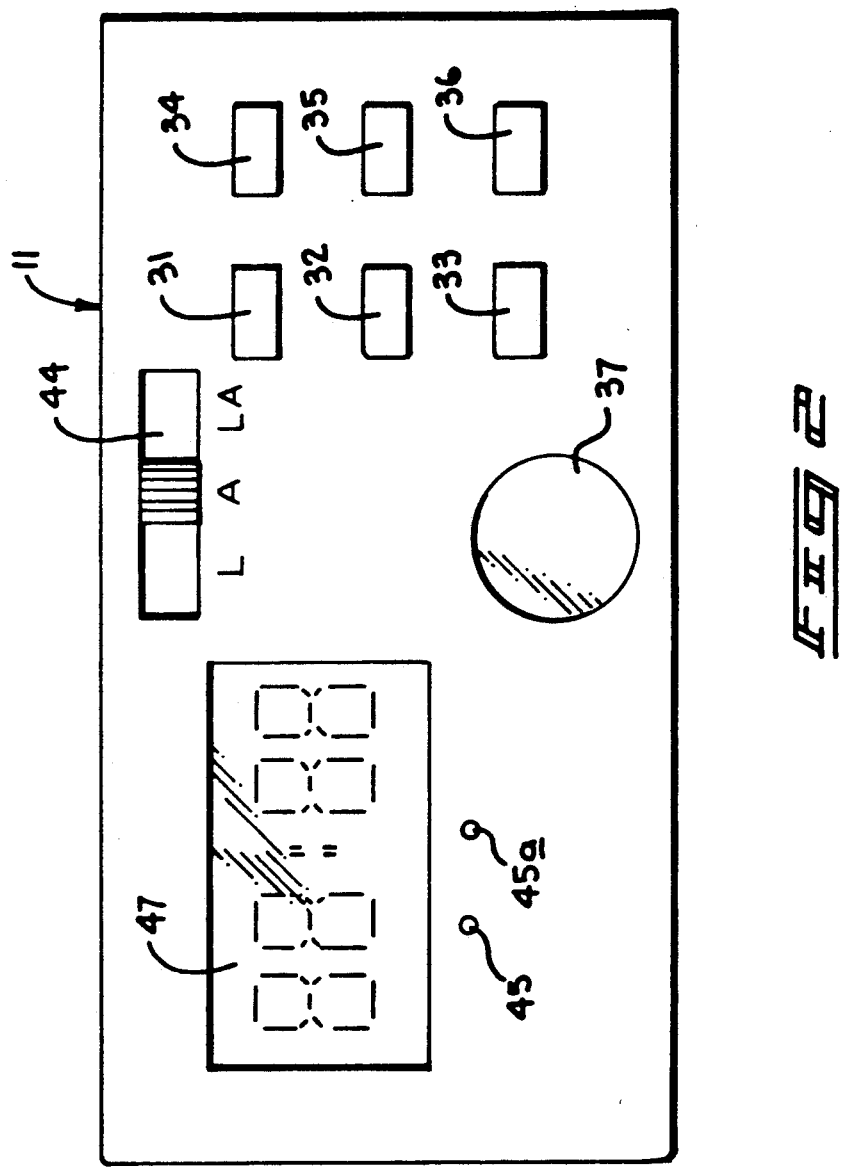
FIG. 2 is a top orthographic view of the housing of the instant invention.

With reference now to the drawings, and in particular to FIGS. 1 to 4 thereof, a new and improved filter alert apparatus embodying the principles and concepts of the present invention and generally designated by the reference numeral 10 will be described.

More specifically, it will be noted that the filter alert apparatus 10 essentially comprises a housing 11 slidably securable to a mounting bracket 12. The housing 11 is formed with a top wall 13, a lower side wall 14 spaced from an opposed and parallel side wall (not shown) including first and second inwardly depending flanges 15 and 16 respectively spaced from a bottom wall 21 below the side walls and opposed end walls 17 to provide a gap of a thickness to receive outwardly extending flanges 12a and 12b therewithin spaced upwardly and outwardly parallel to a support floor 12c of the mounting bracket 12.

Figure 3:
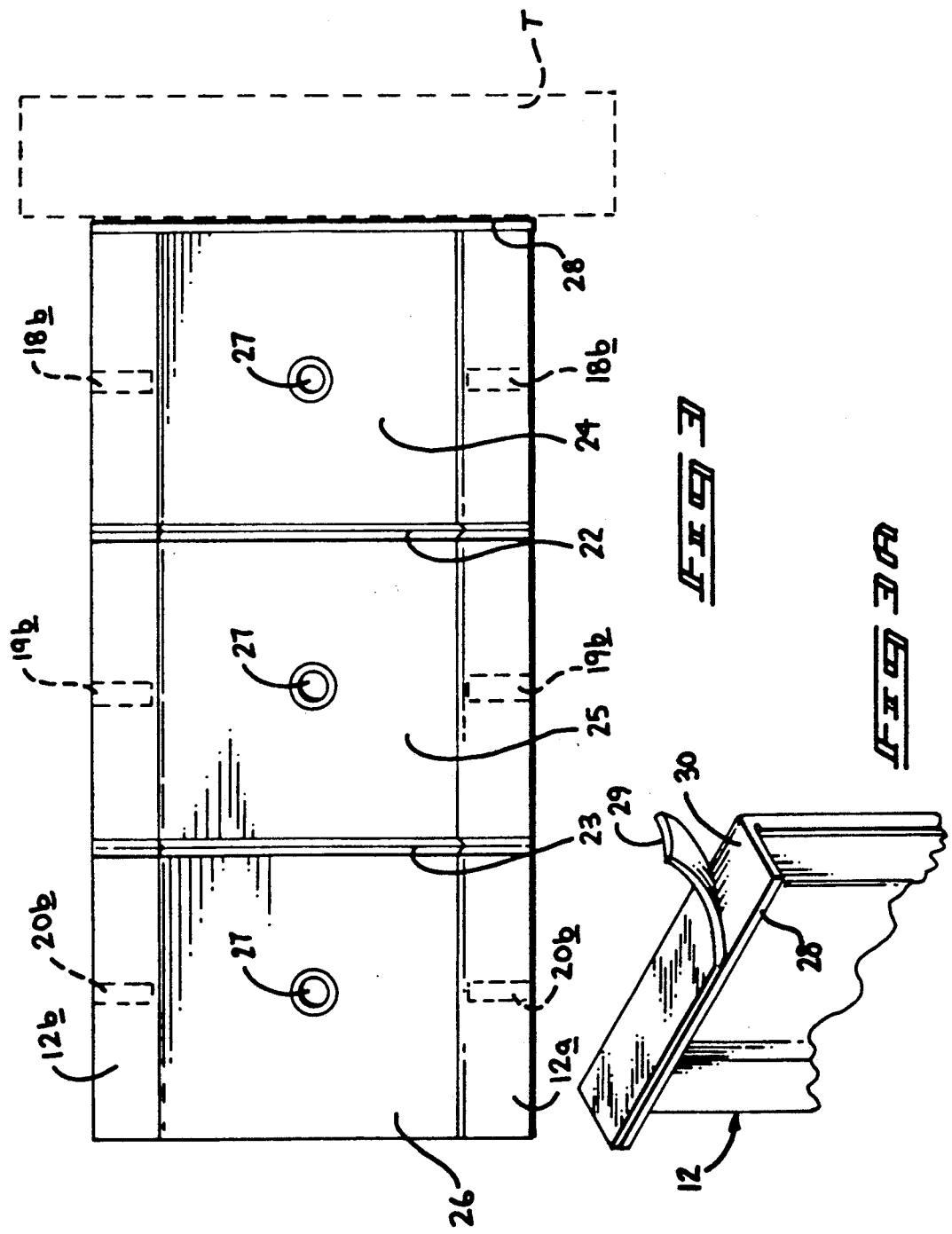
FIG. 3 is a top orthographic view of the mounting bracket of the instant invention.
Figure 4:
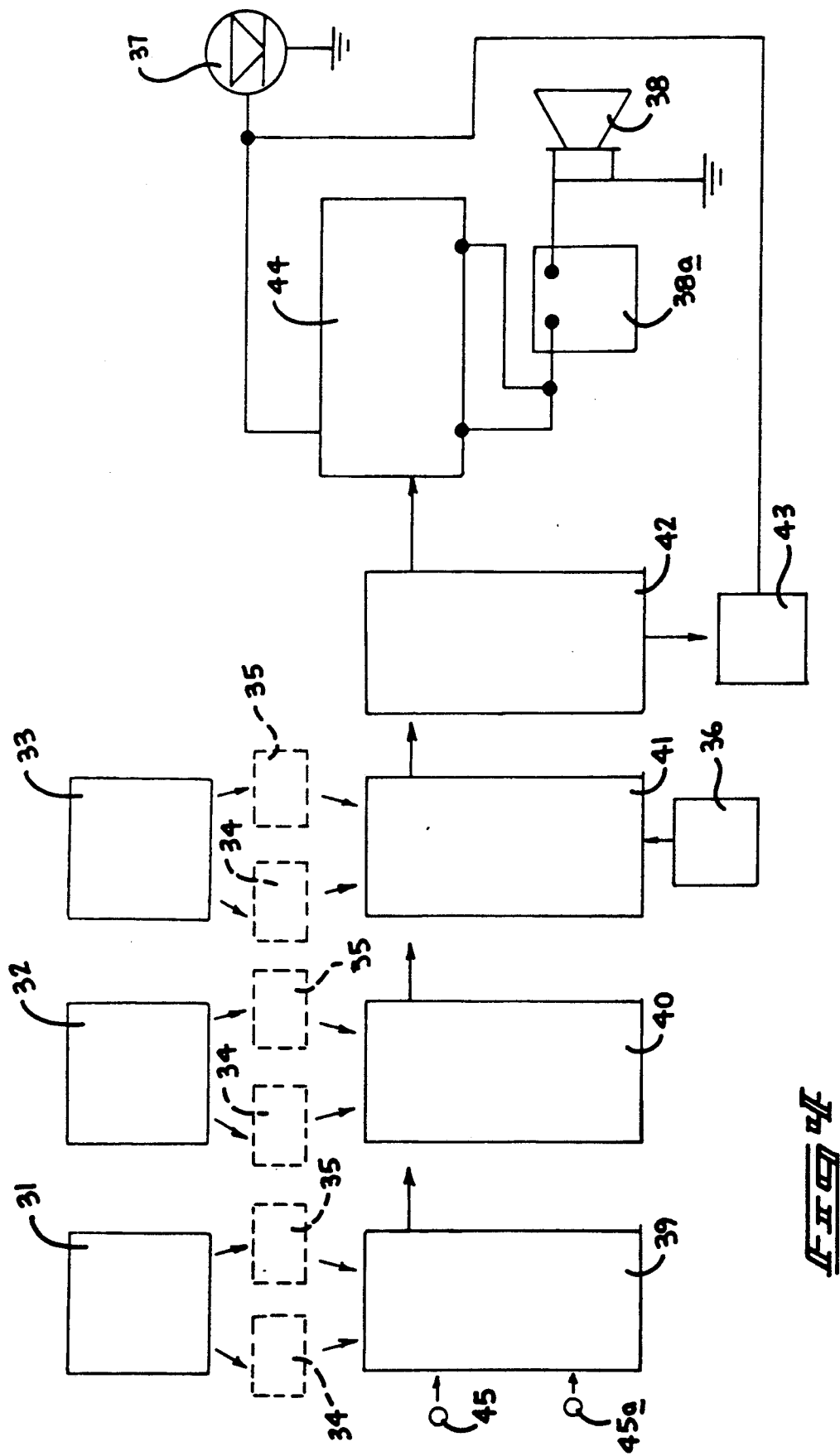
FIG. 4 is a diagrammatic illustration of the timing and alert mechanism of the instant invention.

Fixedly secured within the housing 11 between the first and second flanges 15 and 16 and the bottom wall 21 are pairs of leaf springs formed with medial projections comprising a first leaf spring pair 18, a second leaf spring pair 19, and a third leaf spring pair 20 wherein each of the units of each pair of leaf springs are aligned relative to one another with respective projections 18a, 19a, and 20a aligned with one another generally orthogonally relative to the lengthwise orientation of the mounting bracket 12. The respective pairs of leaf springs and their associated projections are receivable within aligned recesses 18b, 19b, and 20b formed within the aforenoted bracket flanges 12a and 12b. Each pair of recesses are aligned relative to one another and with a through-extending securement aperture 27 for receiving a threaded fastener for selectively securing the bracket 12 to an associated support wall. The recesses and associated securement apertures are each formed within a respective bracket section comprising respective first bracket section 24, second bracket section 25, and third bracket section 26. The respective first, second, and third bracket sections are divided by grooves comprising a first groove 22 positioned medially between the first and second bracket sections 24 and 25 with a second groove 28 extending to define the interface of the second and third bracket sections 25 and 26. The grooves enable the bracket 12 to provide break-away portions wherein the first and/or second sections 24 and 25 may be snapped off relative to the third bracket section 26 to provide a remaining bracket section of a length to accommodate limited wall support surface associated with a pre-existing thermostat housing "T", as illustrated in FIG. 3 for example. The third bracket section 26 has orthogonally secured and integrally formed thereto a mounting flange 28 provided with a removable polymeric strip 29 to expose an adhesive 30 wherein the bracket 12 may be adhesively secured to the thermostat housing "T" in the event it is undesirable or inconvenient to utilize threaded fasteners and the associated securement apertures 27 to secure the bracket 12 to the thermostat. It is desirable to position the filter alert apparatus 10 medially adjacent or in contact with an existing thermostat to associate the alarms (to be discussed below) with a need to service an air filter in conjunction with a furnace the aforenoted thermostat is operably connected to.

The controls of the timing mechanism include a plurality of actuator buttons including an alert time actuator button 31, a current date actuator button 32, an alert/date actuator button 33, an hour/month actuator button 34, a minute/day actuator button 35, a reset actuator button 36, a current time hour actuator button 45 and a current time minute actuator button 45a. The actuator buttons are utilized in conjunction with logic circuitry well known to those of ordinary skill in the art &o actuate selectively a visual indicator light 37 utilizing a light emitting diode (L.E.D.) and an audible alarm 38 directed through a speaker screen 88a positioned within the lower side wall 14.

To set the timing events, the current time actuator buttons 45 and 45a are used to set the correct current time hours and minutes, then the alert time actuator button 31 is depressed and the hour/month actuator button 34 and the minute/day actuator buttons 35 are used sequentially to direct a twelve hour clock function circuit 39 visually displayed on the clock display 47. The current date actuator button 32 is then depressed and the hour/month actuator button 84, &hen the minute/day actuator buttons are sequentially actuated to direct an associated calendar function 40 to hold and display a current month and day within the memory of the calendar function circuit 40. Then the alert day actuator button 83 is depressed and sequentially the hour/month actuator button 34, then the minute/day actuator button 85 is depressed to direct an associated alert date memory function circuit 41 to store a preselected month and day and provide an output associated with a one hertz oscillator 42 to direct the visual indicator light 87 to flash when the appropriate current hour and minute and month and day coincide with the hour and minute and month and day that is pre-set into the respective circuits 39 and 41. The reset button 36 is depressed once the filter maintenance has been completed. This action will automatically advance &he alert date month, in the date memory 41, by one month and clear the flashing (L.E.D.) 37 and reset the timer for the next scheduled maintenance check automatically. If the user desires an earlier or later month or day, they may then change this utilizing the actuation of button 33 in conjunction with actuator button 34 and 35 to select a new alert month and day once the reset button 36 has been depressed. Additionally, a low battery indicator circuit 43 is used to direct the light emitting diode of the visual indicator light 37 to come on steady when a battery voltage contained within the main battery compartment 46 of the apparatus 10 is at less than half power.

A three-way slide switch 44 positioned on the top wall 13 of the housing 11 includes a first position "L", a second position "A", and a third position "LA" to indicate the actuation of the light 37, the audible alarm 38, and the light and audible alarm acting in concert per the first, second, and third positions. The low battery circuit 43 utilizes a self-contained battery within a battery compartment 43a offset from the main battery compartment 46 to provide power to the low battery circuit 43 independently of the main battery source within the compartment 46.

It is understood that the selective actuation of the visual indicator light 37 and/or the audible alarm 38 per the first, second, and third positions of the three-way side switch 44 is to allow the user to have a choice of how they are alerted at the pre-selected alert time, month, and day.

As to the manner of usage and operation of the instant invention, the same should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A programmable timer apparatus for indicating a predetermined time to coincide with maintenance of a furnace filter, said apparatus comprising,
   a housing slidingly securable to a mounting bracket;
   said housing including circuitry means responsive to a plurality of actuator buttons extending through a top surface of said housing for selectively actuating an audible alarm and a visual alarm either individually or in concert at a said predetermined time;
   wherein said clamping means includes a plurality of confronting flanges spaced parallel to a bottom surface of said housing at a predetermined distance, and said bracket including a central planar portion with a plurality of outwardly depending bracket flanges spaced upwardly of said planar portion and outwardly thereof and of a thickness equal to said predetermined distance, said bracket flanges receivable between said flanges and said bottom surface of said housing, and
   wherein each of said bracket flanges include a plurality of pairs of recesses, each of said pairs of said recesses aligned with one another and spaced relative to remaining pairs of recesses, said recesses positioned for receiving resiliently biased projections secured between said flanges and said bottom surface of said housing, said projections including pairs of aligned projections spaced apart a distance equal to a distance defined between said pairs of said recesses, and
   wherein said projections are formed medially of elongate springs secured to said bottom surface of said housing, and
   wherein said bracket further includes a plurality of grooves formed through a top surface of said bracket and spaced between successive pairs of aligned recesses to define a plurality of removable sections, and
   wherein a terminal section of said plurality of sections includes an orthogonally and integrally formed mounting flange wherein said mounting flange is securable to a thermostat housing, and
   wherein said mounting flange includes a removable strip exposing an adhesive thereunder laminated between said strip and said mounting flange to enable adhesive securement of said mounting flange to said thermostat housing, and
   wherein said visual alarm comprises a light emitting diode, and said audible alarm comprises a speaker member directed through a side wall of said housing orthogonally oriented relative to said top surface of said housing, and
   wherein a first battery compartment is provided extending into said side wall of said housing for receiving a battery to actuate said circuitry means, and
   further including a further battery compartment for receiving a further battery to actuate a low battery circuit responsive to a predetermined diminished voltage capacity of said battery, and
   wherein said circuitry means further includes a three-way switch mounted through said top surface of said housing wherein a first position actuates said visual alarm only, a second position actuates said audible only, and a third position actuates the audible and visual alarm in concert, and wherein said circuitry means further includes a reset button electrically associated with a date memory and a flashing light emitting diode display which when depressed at a predetermined appropriate time automatically advances the month in the data memory by a single month and clears the flashing light emitting diode display, and consequently and automatically resets the timer for the next scheduled filter maintenance time to include a month and day designation.

* * * * *